United States Patent Office 2,820,029
Patented Jan. 14, 1958

---

2,820,029

NEW THIO-DERIVATIVES OF COLCHICEINE COMPOUNDS AND A PROCESS OF MAKING SAME

Georges Muller and Leon Velluz, Paris, France, assignors to U. C. L. A. F., Paris, France, a corporation of France No Drawing. Application February 3, 1955
Serial No. 486,036

Claims priority, application France February 10, 1954

10 Claims. (Cl. 260—210)

The present invention relates to new colchiceine derivatives and more praticularly to new thio-derivatives of colchiceine compounds and to a process of making same.

It is one object of the present invention to provide new and valuable compounds of the colchiceine series and more particularly thio colchiceine compounds and their derivatives.

Another object of the present invention is to provide simple and effective processes of producing such new and valuable thiocolchiceine compounds and their derivatives.

A further object of the present invention is to provide new and valuable preparations of low toxicity to be used in industry and agriculture, for instance, for modifying karyokinesis and for causing polyploidism either by applying aqueous solutions or suspensions of the said materials to cultivated soil, or by treating seeds with the said pure materials or in the form of preparations containing the said materials diluted in a solvent or carried by a carrier.

Other objects of the present invention and advantageous features thereof will become apparent as the description proceeds.

In principle, the new compounds according to the present invention are compounds of the colchiceine series in which the methoxy group (—OCH₃) of the tropolone nucleus C of compounds of the following Formula I is replaced by a substituted or unsubstituted alkyl mercapto group (—S-alkyl). The resulting new compounds correspond to the following Formula II:

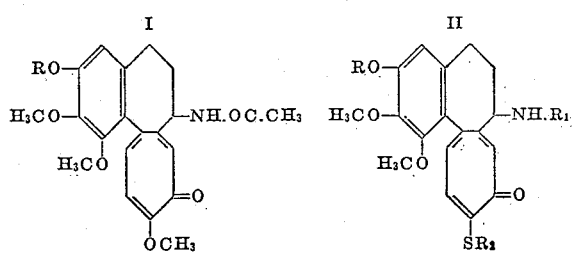

In said formulas:
R is hydrogen, an alkyl radical, an acyl radical, a carbohydrate radical, or a substituted carbohydrate radical;
$R_1$ is hydrogen, an alkyl radical, or an acyl radical; and
$R_2$ is an alkyl radical or a substituted alkyl radical.

The general Formula I is written in agreement with the accepted formulae for colchicine ($R=CH_3$); desmethylcolchicine ($R=H$) according to Santavy and Reichstein, Helv. Chim. Acta. 1950, vol. 33, page 1605; and cochicoside ($R=C_6H_{11}O_5$) the production of which is described and claimed in copending patent application Serial No. 332,115 by Paul Bellet and Gaston Amiard, filed January 19, 1953, and which has been shown to be related to desmethyl-colchicine ($R=H$).

Following the work on nomenclature by Horowitz and Ullyot (J. Am. Chem. Soc., 1952, vol. 74, page 587), it is possible to assign Formula II to the new alkylthiocolchiceine compounds of the present invention.

The new compounds are advantageously distinguished over the colchicine derivatives previously used by their markedly lower toxicity. As is evident from the following table, the therapeutic indices, for instance, of N-desacetyl thiocolchicine and its N-formyl derivative is much higher than those of colchicine and of N-desacetyl-N-methyl colchicine. These indices are obtained by taking the ratio of lethal dose to anti-kariokynetic dose.

TABLE

| | Lethal dise. DL50 | Anti-karı- kynetic dose | Therapeutic Index |
|---|---|---|---|
| colchicine | 2 | 1.1 | 2 |
| N-desacetyl-N-methyl colchicine | 16.5 | 3 | 5.5 |
| N-desacetyl thiocolchicine | 210 | 10 | 21 |
| N-desacetyl-N-formyl thiocolchicine | 10 | 0.5 | 20 |

The new compounds can be produced by various methods. According to one process for the production of compounds according to the present invention, a compound having the general Formula 1 is reacted with a substituted or unsubstituted alkyl mercaptan, the reaction being effected at or slightly below room temperature or at an elevated temperature, and the reaction product is isolated. Preferably the reaction is effected at a temperature between 10° C. and 100° C. The reaction may be effected in the presence of an acid catalyst or in an alkaline medium.

In this way, for instance, it is possible to produce methyl thiocolchiceine, sometimes called thiocolchiceine (Formula II, $R=CH_3$, $R_1=CO.CH_3$, $R_2=-CH_3$) ethyl thiocolchiceine (Formula II, $R=CH_3$, $R_1=CO.CH_3$ and $R_2=C_2H_5$) by the reaction of methyl or ethyl mercaptan with colchicine (Formula I, $R=CH_3$).

According to another process for the production of the compounds in accordance with the present invention, these compounds may be obtained by the reaction of an alkyl mercaptan, which may be substituted, with a desmethyl colchicine (Formula I, $R=H$), followed by alkylation or introduction of a carbohydrate radical which may be acylated, it being understood that the grouping —S-alkyl must not be affected during the course of this reaction.

In accordance with another process for the production of compounds according to the present invention it is possible to obtain these compounds by starting from a derivative of iso-colchiceine having the general Formula III below.

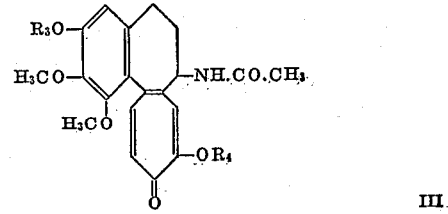

wherein $R_3$ is hydrogen, an alkyl radical and especially the methyl radical, a phenyl monocarboxylic acid radical, or a carbohydrate radical and especially a hexose radical, which may be acylated, and $R_4$ is hydrogen, an alkyl radical, and especially a lower alkyl radical or an aliphatic or aromatic acyl radical and especially a lower aliphatic acyl radical and a phenyl monocarboxylic acid radical.

When a substituted or unsubstituted alkyl mercaptan is reacted with such an iso-colchiceine compound in the presence of an acid catalyst under conditions similar to those employed in the reaction of compounds of the colchiceine series, the reaction does not proceed by simple replacement of the group —$OR_4$ by the group —S-alkyl; instead, rearrangement takes place simultaneously and, in the final products, the keto group and the alkyl thio group take up the positions indicated in Formula II. In this way iso-colchicine, and ethers and esters of iso-colchiceine give rise to substituted or unsubstituted alkyl thiocolchiceines of Formula II.

When operating in the presence of an acid catalyst, preferably of p-toluene sulfonic acid, benzene sulfonic acid, a hydrogen halide, or boron trifluoride, the reaction between the colchicine compound or the iso-colchicine compound described above and the mercaptan may be effected in the presence of a solvent or in the absence thereof, at a temperature around room temperature or somewhat higher, preferably between about 10° C. and about 50° C. In the case of methylmercaptan the reaction is carried out in a sealed tube when working on a small scale and in an autoclave when working on an industrial scale. Depending on the reactivity of the tropolone compound and the temperature of the reaction, contact with the mercaptan and the catalyst is maintained over a period of time varying between several hours and several days. When a solvent is used, it is preferably selected in such a way that the starting material is brought into solution.

When the reaction is complete, the reaction mixture is cooled and excess of mercaptan is removed, for instance, by distillation. In this manner it is possible to recover the unreacted mercaptan and to use it again. When a solvent is used, this is separated according to known processes. The resulting thio-derivative may be purified by crystallization; usually it is obtained with a good yield. When compounds of the iso-colchiceine series are used, the reaction is effected under these same conditions, but the yield is generally lower and sometimes it is necessary to have recourse to chromatography in order to purify the reaction mixture obtained.

The reaction may also be effected in an alkaline medium. For this purpose an aqueous solution of the sodium salt, the potassium salt, or the lithium salt of an alkyl mercaptan which may be substituted, is reacted with a derivative of colchiceine as mentioned above in the absence or presence of an organic solvent, for instance, water-miscible alcohols, such as methanol, ethanol, or water-miscible ethers, such as tetrahydrofuran, or dioxane. This process has certain advantages over the one using an acid catalyst in the case where methyl mercaptan is employed as reactant. The alkali metal salts of methyl mercaptan are not volatile and, therefore, it is possible to work in an open vessel. The alkali metal salts of the mercaptan may be produced separately and introduced when the reaction is effected. It is also possible to produce extemporaneously in aqueous or alcoholic solution of the mercaptan salt by reacting the mercaptan with a titrated solution of an alkali metal hydroxide or alternatively with sodium methylate or ethylate, and to use this solution directly. After reaction, the reaction mixture is acidified, diluted with water, and the thio derivative formed is extracted with a solvent which is immiscible with water. Purification is carried out by fractional crystallization or chromatography. Usually the yields are excellent and very pure compounds are obtained when proceeding in this manner. This process of working in alkaline medium is particularly useful when working with heterosides of colchiceine, as undesirable acid hydrolysis of the carbohydrate linkage is always possible when the reaction is effected in the presence of an acid catalyst. Furthermore, when R in Formula I is an easily saponifiable acyl radical the reaction ends with simultaneous saponification. In this way desmethyl colchicine acetate (Formula I, $R$=—CO—$CH_3$) gives desmethylthiocolchicine (Formula II, $R$=H, $R_1$=—CO.$CH_3$, $R_2$=—$CH_3$).

In accordance with another process of producing compounds according to the present invention, it is possible to react under the above conditions a substituted or unsubstituted alkyl mercaptan with a desmethyl colchiceine (Formula I, $R$=H) in order to obtain the corresponding desmethyl alkyl thiocolchiceine (Formula II, $R$=H, $R_1$=—CO.$CH_3$, $R_2$=substituted or unsubstituted alkyl radical). Said desmethyl alkyl thiocolchiceine compound is readily methylated by the action of diazomethane yielding thereby alkyl thiocolchiceine (Formula II, $R$=—$CH_3$, $R_1$=CO.$CH_3$, $R_2$=substituted or unsubstituted alkyl radical).

When it is desired to obtain a heteroside of an alkylthiocolchiceine (Formula II, $R$=carbohydrate radical which may be acylated, $R_1$=—CO.$CH_3$, $R_2$=substituted or unsubstituted alkyl radical) an alkali metal salt of a substituted or unsubstituted alkyl mercaptan is reacted with the corresponding heteroside of colchiceine or with its acylated derivative; alternatively an aceto bromo carbohydrate is condensed with desmethyl alkyl thiocolchiceine and the acyl groups of the heteroside of the alkyl thiocolchiceine obtained thereby are subsequently saponified.

Compounds of Formula II in which $R_1$ is hydrogen, an alkyl radical, or another acyl radical than the acetyl radical and $R_2$ a substituted or unsubstituted alkyl radical, are obtained by subjecting an alkyl thiocolchicine of Formula II wherein $R_1$ is an acetyl radical and $R_2$ a substituted or unsubstituted alkyl radical, to acid hydrolysis or alcoholysis. When the radical R is unstable under the reaction conditions (for instance, in the case of acetyl, propionyl, benzoyl, trityl, glucosyl or galactosyl radicals), an N-desacetyl desmethyl alkyl-thiocolchiceine is obtained (structural Formula II, $R$=H; $R_1$=H; $R_2$= substituted or unsubstituted alkyl radical). Said compound, if required, can be alkylated, acylated, or converted into the glucoside at the phenolic oxygen atom whereby N-desacetyl alkyl thiocolchiceines (structural Formula II, $R$=alkyl, acyl, acylated or unacylated carbohydrate radical; $R_1$=H; $R_2$=substituted or unsubstituted alkyl radical) are obtained. When, however, the radical R is stable in the presence of acid reagents, there is obtained an N-desacetyl alkyl thiocochiceine (structural Formula II, $R$=alkyl; $R_1$=H; $R_2$=substituted or unsubstituted alkyl radical). It is also possible, without departing from the spirit of the present invention, to subject the starting material first to an alkaline hydrolysis or to any other suitable reaction which sets free the phenolic hydroxyl group or which is capable of modifying its substitution and subsequently to an acid hydrolysis thereby desacylating the acetamino group and producing the corresponding amine.

The N-desacetyl thiocolchiceine compound obtained in this manner is separated from non-reacted starting material by making use of their different solubility in organic solvents.

The process in accordance with the present invention leads with excellent yields to N-desacetylated derivatives having the structure of thiocolchicine.

The amino group may be alkylated or acylated with another acyl group than the acetyl group before or after conversion into thiocolchiceine, i. e. by alkylation or acylation either directly of N-desacetyl colchiceine or subsequently by alkylation or acylation of N-desacetyl thiocolchiceine.

The structure of the new N-desacetyl alkyl thiocolchiceine compounds and N-desacetyl desmethyl alkyl thiocolchiceine compounds is proven by the fact that on treating said compounds with acetic acid anhydride in the presence of pyridine there are obtained, due to acetylation of the amino group, or, respectively, due to acetylation of the amino and the phenol group, the corresponding alkyl thiocolchiceine compounds or the corresponding acetyl desmethyl alkyl thiocolchiceine compounds. The last named compounds yield desmethyl alkyl thiocolchiceine compounds by saponification, in an alkaline medium, of the phenolic acetoxy group. It is, of course, possible to obtain alkyl thiocolchiceine compounds from said desmethyl alkyl thiocolchiceine compounds by methylation.

The following examples illustrate the present invention, without, however, limiting the same thereto. The melting points given in said examples were determined by slowly heating to melting the respective compounds. The power of rotation was determined in chloroform at a concentration of 0.5% by weight unless otherwise stated. All percentages are by weight.

*Example 1.—Thiocolchicine (Formula II, $R=R_2=$—$CH_3$, $R_1=$—$CO.CH_3$) starting from colchicine*

2.5 g. of colchicine and 0.5 g. of p-toluene sulfonic acid monohydrate are introduced into a sealable tube. The lower portion of the tube is put into a mixture of solid carbon dioxide and acetone and, when it is well cooled, 15 g. of methyl mercaptan, cooled to —30° C., are added thereto. The tube is sealed, is removed from the refrigeration mixture, and its temperature is allowed to rise to room temperature (20° C.) while agitating the tube from time to time. Colchicine dissolves fairly easily while p-toluene sulfonic acid dissolves only after about 2 hours. The homogeneous solution which is first of yellow color changes to red without forming a precipitate. The sealed tube is allowed to stand for 6 to 12 days at 20° C., is then cooled to —80° C., is opened, and the mercaptan is distilled off by heating to about 20° C. to about 40° C. When it is desired to effect a fresh reaction it is of advantage to recover excess mercaptan in another sealable tube cooled to —50° C. or —80° C., to again introduce into this second tube the required amounts of colchicine and p-toluene sulfonic acid monohydrate and to again effect the reaction as described above.

The residue from the distillation of the mercaptan and, when present, of the solvent is obtained in the form of a thick resin which is red in color and very unpleasant in smell. This residue is taken up in a mixture of 50 cc. of chloroform or ethyl acetate and 20 cc. of water, sodium bicarbonate is added till a neutral reaction is obtained. The aqueous phase is separated from the solvent phase and is again extracted with the same solvent. The combined solvent extracts are washed with water.

After drying the extract with magnesium sulfate and distillation to dryness there are obtained 2.6 g. of a waxy residue which is yellow-brown in color and which is recrystallized from ethyl acetate. The weight of the final product obtained is 2.1 g., corresponding to 80% yield of the theoretical yield. The condensation with methyl mercaptan may also be effected in the presence of about 5 volumes of a solvent such as chloroform or tetrahydrofuran, and this solvent is driven off as soon as the mercaptan has been distilled off. The thiocolchicine is present in the form of cubic crystals having a yellow color and a melting point of 192–194° C.; $[\alpha]_D^{20}=$—221°. Thiocolchicine is very soluble in chloroform, well soluble in ethanol, and soluble in acetone. It is dissolved by 15 volumes of hot ethyl acetate and is insoluble in ether. It is stable in an aqueous alkaline medium up to 100° C. This stability differentiates the new compound from colchicine. The tendency of solvation is as marked as in the last mentioned compound.

ANALYSIS $C_{22}H_{25}O_5NS$ found: C% 63.7, H% 6.0, N% 3.2, S% 8.1. Calculated: C% 63.6, H% 6.1, N% 3.4, S% 7.7.

*Example 2.—Thiocolchicine (Formula II, $R=R_2=$—$CH_3$, $R_1=$—$CO.CH_3$) starting from colchicine*

20 g. of sodium hydroxide in the form of pellets are dissolved in water in such a way that a total volume of 80 cc. is obtained; 25 g. of methylmercaptan are introduced into said sodium hydroxide solution while cooling, the mixture is allowed to stand at 0° C. for four hours, and the resulting sodium salt of methyl mercaptan is filtered off by suction. 2.5 g. of said sodium salt of methyl mercaptan are then introduced into a solution of 5 g. of colchicine in 100 cc. of water. The mixture is stirred mechanically, in order to cause dissolution. The reaction mixture is allowed to stand at 20° C. for 16 hours and the mixture is then poured into water and is extracted therefrom with several portions of chloroform. The chloroform extracts are combined and washed until neutral and, after drying the chloroform solution over magnesium sulfate, distillation is effected until dry. The residue is taken up in benzene. Chromatography over alumina gives a chloroform eluate containing 2.1 g. of thiocolchicine, melting point 192° C.; $[\alpha]_D=$—221°. Said compound is identical with the compound described in Example 1. There is recovered, on the other hand, 50% of the colchicine used which is retained, adsorbed to the adsorption column, more strongly than thiocolchicine. The overall yield of the thiocolchicine in this way reaches 80% of the theoretical yield.

*Example 3.—Thiocolchicine (Formula II, $R=R_2=$—$CH_3$, $R_1=$—$CO.CH_3$) starting from colchicine*

Variant (a).—5 g. of colchicine are dissolved in 100 cc. of water and the resulting solution is added to a solution obtained by the reaction of 15 g. of methyl mercaptan with 12 g. of sodium hydroxide dissolved in 50 cc. of water. The reaction is carried out as in Example 2 and thiocolchicine is obtained with the same yield.

Variant (b).—5 g. of colchicine dissolved in 100 cc. of water are mixed with a solution obtained by reacting 15 g. of methyl mercaptan with 17 g. of potassium hydroxide in 50 cc. of water. After a reaction and working up operation similar to the one described in Example 2, there are obtained 25% of the theoretical yield of thiocolchicine and 55% of the colchicine used is recovered.

Variant (c).—5 g. of colchicine are dissolved in a mixture of 50 cc. of water and 50 cc. of methanol or ethanol. After heating the mixture to 30° C. there is introduced with vigorous agitation a solution produced by the reaction of 15 g. of methyl mercaptan with 7.5 g. of lithium hydroxide dissolved in 60 cc. of water. After standing for 12 hours at 30° C., there are obtained, after a reaction and working up operation similar to the one described in Example 2, 23% of the theoretical quantity of thiocolchicine and 60% of colchicine which has not been reacted and may be used again for a fresh reaction.

*Example 4.—Thiocolchicine (Formula II, $R=R_2=$—$CH_3$, $R_1=$—$CO.CH_3$) starting from iso-colchicine*

Following the procedure as described in Example 1, 1 g. of iso-colchicine is reacted with 10 g. of methyl mercaptan in the presence of 0.2 g. of p-toluene sulfonic acid for 5 days. Dissolution takes place fairly rapidly and the solution which at first is yellow then changes to red. After distilling off the mercaptan, then residue is extracted by means of 50 cc. of chloroform. The chloroform extract is evaporated to dryness, the residue is dissolved in ethyl acetate, and the solution is subjected to chromatographic adsorption on neutral alumina. Eluting is effected with 12 portions of 100 cc. each of the same solvent. The first 400 cc. give 680 mg. of a non-crystallizable product which is amorphous. The following 800 cc. give, after evaporation of the solvent, 370 mg. of a residue which, after recrystallization from 2 cc. of ethyl acetate, melts at 187–190° C. When mixed with thiocolchicine having a melting point of 192° C. this material does not lower the melting point thereof. The substance obtained has all the properties of thiocolchicine enumerated above.

*Example 5.—Thiocolchicine (Formula II, $R=R_2=-CH_3$, $R_1=-CO.CH_3$) starting from colchiceine acetate*

In accordance with the procedure described in Example 1, 2.5 g. of colchiceine acetate are reacted with 10 g. of methyl mercaptan in the presence of 0.5 g. of p-toluene sulfonic acid. Dissolution takes place after 1½ hours and after 3 days of contact at 20° C. the mercaptan is distilled off. The chloroform extract freed from the acid fraction by washing with sodium hydroxide yields 730 mg. of a neutral fraction which is non-crystalline and which is chromatographed in ethyl acetate solution on a column of 100 g. of neutral alumina suspended in ether. Elution is effected with 11 portions of 100 cc. each of ethyl acetate. The fractions 4, 5 and 6 are combined and yield, after evaporation of the solvent, 360 mg. of a crystalline product melting in a melting-point tube at 192–194° C. and giving no depression of the melting point with thiocolchicine produced in accordance with Example 1. Said product as obtained according to the present example has the same rotatory power and solubility as the thiocolchicine obtained according to Example 1.

The aqueous sodium hydroxide solution contains colchiceine which results from saponification of the starting material during the course of the reaction. In this way 1.7 g. of colchiceine (corresponding to 1.85 g. of colchiceine acetate, equivalent to 74% of the starting material used) are obtained.

*Example 6.—Desmethyl thiocolchicine (Formula II, $R=H$, $R_1=-CO.CH_3$, $R_2=-CH_3$) starting from desmethyl colchicine acetate.*

As desmethyl colchicine is not sufficiently soluble in methyl mercaptan, the reaction is effected with its acetate and the acetate of desmethyl thiocolchicine formed thereby is then saponified.

2.6 g. of desmethyl colchicine acetate and 0.4 g. of p-toluene sulfonic acid monohydrate are introduced into a tube capable of being sealed, the tube with its contents is cooled to —80° C., and about 12 g. of methylmercaptan are put into the tube. The tube is sealed and its temperature is allowed to rise to +20° C. Dissolution takes place more slowly than in the case of colchicine. The mixture is agitated. It is first of pasty consistency and is converted into a homogeneous liquid after 12 hours.

After standing for seven days there is formed a red precipitate which adheres to the wall of the tube. The reaction mixture is left to stand for four more days at 20° C. which procedure appreciably increases the red precipitate. After said 11 days, excess mercaptan is recovered as previously described and the red residue is taken up in 200 cc. of chloroform. The chloroform solution is first washed with sodium bicarbonate solution in order to eliminate the p-toluene sulfonic acid and then with water. After drying, the solution is evaporated to dryness yielding a residue of solvated desmethyl thiocolchicine acetate weighing 3.2 g. This crude solvated acetate is dissolved in 50 cc. of 95% ethanol. 15 cc. of an N aqueous solution of sodium hydroxide are added to said solution and the resulting mixture is allowed to stand for 10 minutes at 20° C. The mixture is then diluted with 200 cc. of water and extracted with 50 cc. of chloroform in order to eliminate non-phenolic substances. The red alkaline layer containing the desmethyl thiocolchicine is acidified by means of hydrochloric acid until congo paper is turned blue. The solution is twice extracted with chloroform. The chloroform extracts are combined, dried, and evaporated to dryness. The residue which weighs 5 g. consists of desmethyl thiocolchicine which is strongly solvated. This compound is dissolved in 20 cc. of hot ethyl acetate which breaks up the chloroform solvate. After cooling, the desmethyl thiocolchicine crystallizes out. Said compound is filtered off by suction, washed with ethyl acetate, again filtered off by suction, and dried. In this way 1.93 g. (corresponding to a yield of 79%) of a compound melting at 305° C. are obtained. The yellow product is soluble in alcohol, acetone, and dimethyl formamide; it dissolves in approximately 200 parts of cold chloroform. It is insoluble in water, aqueous dilute acids, ether and benzene. It dissolves in aqueous dilute alkalis giving a red solution. Desmethyl thiocolchicine is purified by dissolving 600 mg. thereof in 3 cc. of dimethyl formamide at 100° C.; there are then added 15 cc. of ethyl acetate, the mixture is filtered, and the filtrate is allowed to slowly crystallize. In this way 400 mg. of pure desmethyl thiocolchicine melting at 308° C. are obtained; $[\alpha]_D^{20}=-249°\pm2°$. These physical properties do not vary after repeated recrystallization.

ANALYSIS

Found: C% 62.9, H% 5.8, N% 3.3, S% 7.5. $C_{21}H_{23}O_5NS$ calculated: C% 62.8, H% 5.8, N% 3.5, S% 8.0.

*Example 7.—Desmethyl thiocolchicine (Formula II, $R=H$, $R_1=-CO.CH_3$, $R_2=-CH_3$) starting from desmethyl colchicine*

200 mg. of desmethyl colchicine are mixed with a solution of 200 mg. of the sodium salt of methyl mercaptan, obtained in accordance with Example 1, dissolved in 4 cc. of water. The reaction mixture is shaken until a homogeneous solution is obtained. After standing for one night the solution is run into water, acidified with hydrochloric acid, extracted with several portions of chloroform, washed with sodium carbonate solution and with water, the chloroform extracts are combined, dried, and distilled to dryness.

The resulting residue gives, on repeated recrystallization from ethyl acetate and acetone, 145 mg. of desmethyl thiocolchicine in the pure state, corresponding to a yield of 70%; melting point: 308° C., $[\alpha]_D^{20}=-249°$.

*Example 8.—Desmethyl thiocolchicine (Formula II, $R=H$, $R_1=-CO.CH_3$, $R_2=-CH_3$) starting from desmethyl colchicine acetate*

220 mg. of desmethyl colchicine acetate are treated with the sodium salt of methyl mercaptan under conditions as described in Example 7. During the course of the reaction saponification takes place and, after extraction with chloroform and purification under the conditions hereinbefore disclosed, pure desmethyl thiocolchicine is obtained. This compound causes no depression of the melting point when mixed with the compound obtained in accordance with the method described in Example 7.

It is, of course, understood that the variants described in Examples 3(a), (b) and (c) (used for the production of thiocolchicine) may also be used for the production of desmethyl thiocolchicine.

*Example 9.—Thiocolchicine (Formula II, $R=R_2=-CH_3$, $R_1=-CO.CH_3$) starting from desmethyl thiocolchicine*

1.6 g. of desmethyl thiocolchicine, produced according to Example 6, are dissolved in 40 cc. of methanol and 30 cc. of an 0.6% solution of diazomethane in toluene are added thereto. The reaction is fairly vigorous at the beginning and the temperature is kept within the range of 10 to 20° C. by applying external cooling. When the reaction has calmed down, an excess of diazomethane is added and the reaction mixture is then left to stand for two more hours. To the orange-colored solution resulting thereby there are added 2 cc. of acetic acid in order to destroy the excess of diazomethane. The methylation proceeds quantitatively as washing of the toluene solution by means of sodium hydroxide does not extract any phenolic substance. The toluene solution is then washed with water, is dried, and is distilled to dryness in a vacuum. In this way 1,640 g. of crude thiocolchicine are obtained; this material, on recrystallization from ethyl acetate to which an equal volume of ether had been added, melts at 188–190° C. and does not depress the melting point of thiocolchicine produced according to Example 1.

*Example 10.—Tetraacetate of thiocolchicoside (Formula II, R=tetraacetylglucosyl, $R_1=$ —$CO.CH_3$, $R_2=$ —$CH_3$) starting from colchicoside tetraacetate*

As colchicoside is insoluble in methylmercaptan its tetraacetyl derivative (produced according to French Patent No. 1,053,179) which dissolves easily therein is used as starting material. The reaction is carried out in a similar manner as described in Examples 1 and 6, but using 3 g. of tetraacetate of colchicoside and 25 g. of methyl mercaptan in the presence of 0.4 g. of p-toluene sulfonic acid monohydrate; the reaction mixture is allowed to stand for 5 days during which time a precipitate appears. After distilling off excess methyl mercaptan the residue is taken up in 100 cc. of ethyl acetate or chloroform, the solution is washed with sodium bicarbonate solution, then with water, is dried over sodium sulfate, and the solvent is distilled off. There results a residue having a resinous appearance and weighing 2.82 g. which does not crystallize from the usual solvents but which is sufficiently pure for hydrolysis to desmethyl thiocolchicine or for saponification to thiocolchicoside.

*Example 11.—Thiocolchicoside (Formula II, $R=C_6H_{11}O_5$, $R_1=$ —$CO.CH_3$, $R_2=$ —$CH_3$) starting from thiocolchicoside tetraacetate*

2.7 g. of thiocolchicoside tetraacetate are dissolved in 42 cc. of ethanol and 7 cc. of N sodium hydroxide solution are added. The resulting reaction mixture is allowed to stand for 24 hours at 20° C., is then neutralized and extracted with a mixture of chloroform and ethanol (8:2). The resulting extract is washed with water, dried, and evaporated to dryness. The then resulting residue consists of thiocolchicoside. After triturating this compound with 10 volumes of ether, it is filtered by suction and yields, after drying, 1.2 g. of thiocolchicoside in the form of a powder which crystallize from ethyl acetate. F=215° C; $[\alpha]_D^{20}=-550°\pm10°$ (0.5% concentration in water).

*Example 12.—Desmethyl thiocolchicine (Formula II, $R=H$, $R_1=$ —$CO.CH_3$, $R_2=$ —$CH_3$) starting from thiocolchicoside tetraacetate*

30 cc. of methanol are used to dissolve 1.5 g. of crude thiocolchicoside tetraacetate (obtained according to Example 10) and 120 cc. of 0.2 N of hydrochloric acid are added. The methanol is evaporated and the reaction mixture is heated on a water bath for 2 hours during the course of which there is formed a black precipitate. The mixture is cooled, sodium hydroxide solution is added until the pH value is above 10, and the resulting alkaline solution is extracted with chloroform in order to free it from non-phenolic substances. The sodium hydroxide solution, which has a red color, is acidified with hydrochloric acid and is extracted with chloroform. After drying and evaporation to dryness there remains a residue of 480 mg. of desmethyl thiocolchicine in the crude state, corresponding to a yield of 58% of theory. On recrystallization from 2 to 3 cc. of dimethyl formamide to which 15 cc. of ethyl acetate had been added, there result 420 mg. of desmethyl thiocolchicine melting at 305° C. A mixture of said compound with the highly pure product obtained in accordance with Example 6 (melting point 308° C.) melts at 306° C. which proves that the two substances are identical.

Instead of starting with thiocolchicoside tetraacetate it is also possible o hydrolyze according to the method of the present example the thiocolchicoside obtained in accordance with Example 11; this also gives rise to desmethyl thiocolchicine.

*Example 13.—Thiocolchicoside (Formula II, $R=C_6H_{11}O_5$, $R_1=$ —$CO.CH_3$, $R_2=$ —$CH_3$) starting from colchicoside*

400 mg. of colchicoside are introduced into a solution of 400 mg. of sodium methyl mercaptide in 2 cc. of water while vigorously agitating. After allowing the mixture to stand for 16 hours at 23° C., the orange solution is acidified with acetic acid and this mixture is extracted several times with a mixture of chloroform and ethanol (1:1). The extracts are combined, dried over potassium carbonate, and then distilled to dryness. The thiocolchicoside in the crude state obtained in this way is purified by recrystallization first from ethanol and then from ethyl acetate. The product is obtained with a yield of 50% and is present in the form of small squares or octagonal prisms having a clear yellow color and melting at 215° C., $[\alpha]_D^{20}=-550°\pm10°$ (0.5% concentration in water). The thiocolchicoside, identical with the product described in Example 11, is soluble in 1 volume of water or aqueous acids or alkalies. It is also soluble in 20 volumes of ethanol with which the product gives a solvate containing 1 mol of ethanol. The product is insoluble in ether, acetone and benzene.

ANALYSIS

Found: C% 57.6, H% 6.1, O% 28.5, N% 2.3, S% 5.7. $C_{27}H_{33}O_{10}NS$ (=563.6) requires C% 57.5, H% 5.9, O% 28.4, N% 2.5, S% 5.7.

It is, of course, understood that this compound may also be produced according to the variants described for the production of thiocolchicine in Examples 3 (a), (b) and (c).

The constitution of thiocolchicoside is proved by its synthesis starting from desmethyl thiocolchicine (Formula II, $R=H$, $R_1=$ —$CO.CH_3$, $R_2=$ —$CH_3$) by reacting it with bromo aceto glucose and saponification of the resulting tetraacetyl glucoside (Formula II, $R=$ tetraacetyl glucosyl, $R_1=$ —$CO.CH_3$, $R_2=$ —$CH_3$).

*Example 14.—Thiocolchicoside (Formula II, $R=C_6H_{11}O_5$, $R_1=$ —$CO.CH_3$, $R_2=$ —$CH_3$) starting from desmethyl thiocolchicine*

500 mg. of desmethyl thiocolchicine (Formula II, $R=H$, $R_2=$ —$CH_3$) produced according to the method of Example 7 are dissolved in 2.5 cc. of N sodium hydroxide solution. The resulting solution is cooled to 0° C. and 700 mg. of crystallized tetraacetyl bromo glucose dissolved in 3.5 cc. of acetone are added thereto. The resulting red solution is allowed to stand for 15 hours and 25 cc. of weakly alkaline water is added thereto. Chloroform is used to extract the resulting mixture, washing is effected with water, and drying over magnesium sulfate. The colchicoside tetraacetate obtained in this way is directly saponified by 0.03 cc. of alcoholic potassium hydroxide after dissolution in 3 cc. of ethanol by allowing it to stand overnight in the cold. The resulting thiocolchicoside is filtered with suction and purified as described in Example 13. The resulting product does not depress the melting point of thiocolchicoside described in and obtained according to the preceding example and has the same physical characteristic properties and solubility.

*Example 15.—Production of ethyl thiocolchiceine (Formula II, $R=$ —$CH_3$, $R_1=$ —$CO.CH_3$, $R_2=C_2H_5$) starting from colchicine*

2 g. of colchicine are dissolved in 5 cc. of chloroform and a suspension of 300 mg. of p-toluene sulfonic acid in 4 cc. of ethyl mercaptan (boiling point 37° C.) are added to the resulting solution. The reaction mixture is stirred until dissolution takes place, and is allowed to stand in a closed receptacle for several days at 20° C. Evaporation to dryness is effected and the residue is taken up in chloroform, the resulting solution being washed, dried and evaporated to dryness. The residue is crystallized from ethyl acetate and yields 1.2 g. (54%) of ethyl thiocolchiceine having a melting point of 207–208° C., $[\alpha]_D^{20}=-226°$. The compound is obtained in the form of yellow crystals which are insoluble in water, ether and petroleum ether, but soluble in chloroform, methanol, ethanol, acetone, and dimethylformamide.

ANALYSIS

Found: C% 64.1, H% 6.2, O% 18.4, N% 3.3, S% 7.6. $C_{23}H_{27}O_5NS$ (=429.52) requires C% 64.3, H% 6.3, O% 18.6, N% 3.3, S% 7.5.

*Example 16.—Production of ethylthiocolchiceine (Formula III, $R=-CH_3$, $R_1=-CO.CH_3$, $R_2=-C_2H_5$) starting from colchicine*

2 g. of colchicine are dissolved in 4 cc. of ethyl mercaptan, 300 mg. of benzene sulfonic acid are added, and the resulting mixture is allowed to stand in a closed receptacle for one week at 20° C. The resulting precipitate is filtered with suction and is crystallized from a mixture of acetone and water. Ethyl thiocolchiceine is obtained thereby. The compound is identical with the compound described in Example 15. The yield is 35%.

*Example 17.—Production of ethyl thiocolchiceine (Formula II, $R=-CH_3$, $R_1=-CO.CH_3$, $R_2=-C_2H_5$) starting from colchicine*

2 g. of colchicine are dissolved in 10 cc. of tetrahydrofuran, first 4 cc. of ethylmercaptan and then a few drops of concentrated hydrochloric acid are added, and the resulting mixture is allowed to stand in a closed receptacle for 6 days at room temperature. After treatment as indicated in Example 15 ethyl thiocolchiceine is obtained with a yield of 25%.

*Example 18.—Production of ethyl thiocolchiceine (Formula II, $R=-CH_3$, $R_1=-CO.CH_3$, $R_2=-C_2H_5$) starting from colchicine*

2 g. of colchicine are dissolved in 40 cc. of water, a solution of 1.5 g. of ethyl mercaptan in 30 cc. of N sodium hydroxide solution is added, and the resulting mixture is allowed to stand for 2 days at room temperature. The reaction mixture is extracted with chloroform. After working up the extract as described in Example 15 ethyl thiocolchiceine is obtained in a yield of 35%.

*Example 19.—Production of ethyl thiocolchiceine (Formula II, $R=-CH_3$, $R_1=-CO.CH_3$, $R_2=-C_2H_5$) starting from colchicine*

2 g. of colchicine are dissolved in 40 cc. of ethanol containing 50% of water. A solution of 1.5 g. of ethyl mercaptan in 30 cc. of N sodium hydroxide solution are added and the resulting mixture is allowed to stand for 2 days at room temperature. The reaction mixture is extracted with chloroform. After working up the extract as described in Example 15, ethyl thiocolchiceine is obtained in a yield of 35%.

*Example 20.—Production of ethyl thiocolchiceine (Formula II, $R=-CH_3$, $R_1=-CO.CH_3$, $R_2=-C_2H_5$) starting from colchicine*

2 g. of colchicine are dissolved in 40 cc. of water. A solution of 1.5 g. of ethyl mercaptan in 30 cc. of N potassium hydroxide solution is added and the resulting mixture is allowed to stand for 2 days at room temperature. The reaction mixture is extracted with chloroform. The chloroform extract is worked up as described in Example 15 whereby ethyl thiocolchiceine is obtained in a yield of 35%.

*Example 21.—Production of ethyl thiocolchiceine (Formula II, $R=-CH_3$, $R_1=-CO.CH_3$, $R_2=-C_2H_5$) starting from colchicine*

2 g. of colchicine are dissolved in 40 cc. of water. A solution of 1.5 g. of ethyl mercaptan in 30 cc. of N lithium hydroxide solution is added and the resulting mixture is allowed to stand for 2 days at room temperature. The reaction mixture is extracted with chloroform and the extract is worked up as described in Example 15. Thereby ethyl thiocolchiceine is obtained with a yield of 30%.

*Example 22.—2-hydroxy ethyl thiocolchiceine (Formula II, $R=-CH_3$, $R_1=-CO.CH_3$, $R_2=-CH_2-CH_2OH$) starting from colchicine*

8 g. of colchicine are dissolved in 16 cc. of dry chloroform. First 16 cc. of mercapto ethanol and then 1.2 g. of p-toluene sulfonic acid are added to said solution. After standing for seven days at room temperature, the mixture is poured into water, extracted with chloroform, and the resulting solution is dried and evaporated to dryness. The resulting residue is taken up in 80 cc. of boiling ethyl acetate and this solution is allowed to crystallize. 5.1 g. (55%) of 2-hydroxy ethyl thiocolchiceine of the melting point 225–228° C. are obtained. The product is recrystallized from a mixture of ethanol and ether (1:3). The compound is insoluble in water, ether, petroleum ether, but is soluble in ethanol, methanol, chloroform, and dimethylformamide. Melting point 234° C.; $[\alpha]_D^{20}=-214°$.

ANALYSIS

Found: C% 61.9, H% 6.3, N% 3.1, S% 7.5. $C_{23}H_{27}O_6NS$ requires C% 62.0, H% 6.11, N% 3.14, S% 7.2

*Example 23.—2-hydroxy ethyl thiocolchiceine (Formula II, $R=-CH_3$, $R_1=-CO.CH_3$, $R_2=-CH_2-CH_2OH$) starting from colchicine*

500 mg. of colchicine are dissolved in 10 cc. of water. 1 cc. of mercapto ethanol and 2 cc. of 25% aqueous potassium hydroxide solution are added to said solution and the resulting mixture is allowed to stand for 48 hours at room temperature. The reaction mixture is extracted with chloroform and the extract is worked up as described in Example 22. Chromatographic purification of the residue yields 55 mg. (10%) of 2-hydroxy ethyl thiocolchiceine in the pure state. This product is identical with the one obtained in the preceding example.

*Example 24.—N-desacetyl thiocolchicine (Formula I, $R=-CH_3$, $R_1=H$, $R_2=-CH_3$) starting from thiocolchicine*

To 4.88 g. of thiocolchicine there are added 60 cc. of methanol and 60 cc. of 2 N hydrochloric acid. The mixture is heated under reflux for 18 hours. Thereafter 40 cc. of aqueous methanol are distilled off and the remaining solution is extracted three times, using 100 cc. of chloroform each time. The chloroform extracts are combined and washed four times using 100 cc. of water each time. The washed chloroform extract is dried and distilled to dryness, yielding 400 mg. of crude thiocolchicine.

The aqueous layer, which is extracted with chloroform, and the wash waters are combined, mixed with 10 N sodium hydroxide solution until a pH value of 13 is achieved, and then extracted five times each with 100 cc. of chloroform. The combined chloroform extracts are washed twice with 50 cc. of water each time, dried, and distilled to dryness. A residue weighing 5.2 g., due to the presence of chloroform of solvation, is obtained. This residue is taken up in 20 cc. of chloroform and 120 cc. of ether are added thereto; crystallization sets in immediately yielding 3.52 g. of desacetyl thiocolchicine (Formula I, $R=CH_3$; $R_1=H$; $R_2=-CH_3$), corresponding to a yield of 80%. The product melts at 195° C. After recrystallization from the mixture of dioxane and ether (1:3), the melting point is raised to 200° C.;

$$[\alpha]_D^{20} = -207°$$

(0.5% concentration in chloroform).

ANALYSIS

Found: C% 64.2, H% 6.3, N% 3.7, S% 8.3, O% 17.4. $C_{20}H_{23}O_4NS$ requires C% 64.3, H% 6.2, N% 3.8, S% 8.6, O% 17.1.

*Example 25.—Production of N-desacetyl desmethyl thiocolchicine (Formula I, $R=H$; $R_1=H$; $R_2=CH_3$) starting from desmethyl thiocolchicine*

4.2 g. of desmethyl thiocolchicine of the melting point 308° C. $[\alpha]_D^{20} = -249°$ (0.5% concentration in chloroform) are heated under reflux for 24 hours in 60 cc. of methanol and 60 cc. of hydrochloric acid (2 N). After distilling off the methanol the mixture is neutralized with sodium bicarbonate and is extracted with chloroform. The chloroform extract is evaporated to dryness. Recrystallization of the residue from ethanol yields 3.1 g. (80% yield) of the pure compound having a melting point of 185° C., $[\alpha]_D^{20} = -213°$ (0.5% concentration in ethanol). The N-desacetyl desmethyl thiocolchicine is obtained in the form of prismatic needles of a yellow-orange color. It is soluble in 15 parts by volume of hot ethanol and 100 parts by volume of cold ethanol, in chloroform, but is insoluble in ether, petroleum ether, and water. It is soluble in alkalies and acids due to its amphoteric nature which derives from the presence of an amino group and a phenol group, both in the free state, in its molecule.

ANALYSIS

Found: C% 63.4, H% 6.0, O% 17.8, N% 3.8, S% 8.9. $C_{19}H_{21}O_4NS$ (359.4) requires C% 63.5, H% 5.9, O% 17.8, N% 3.9, S% 8.9.

The N-desacetyl desmethyl thiocolchicine yields a hydrochloride which is soluble in water and which is produced by treating an ethanolic solution of the base with a slight excess of 2 N hydrochloric acid and precipitating the hydrochloride with ether.

*Example 26.—Production of N-desacetyl desmethyl thiocolchicine starting from thiocolchicoside tetraacetate*

2 g. of thiocolchicoside tetraacetate are hydrolyzed by heating with 100 cc. of 2 N hydrochloric acid for 40 hours. After neutralization, the mixture is extracted with chloroform and, after purification according to Example 25, N-desacetyl desmethyl thiocolchicine is obtained with a yield of 60%. The physical and chemical properties of this compound are the same as those of the compound described in Example 25.

*Example 27.—Production of N-desacetyl desmethyl thiocolchicine starting from thiocolchicoside tetraacetate by means of fractional hydrolysis*

The procedure is the same as set forth in Example 26, but the hydrolysis is interrupted after heating for six hours. The resulting desmethyl thiocolchicine is then extracted with chloroform. After washing, drying, and evaporation, there is obtained desmethyl thiocolchicine having a melting point of 308° C. $[\alpha]_D^{20} = -249°$, with a yield of 60%.

The chloroform wash waters are combined with the aqueous hydrolysis layer. The mixture is neutralized with sodium bicarbonate, extracted with chloroform, and the compound obtained from said chloroform extracts is purified as set forth in Example 25. In this way, N-desacetyl desmethyl thiocolchicine with a yield of 12% is obtained.

*Example 28.—Production of N-desacetyl desmethyl thiocolchicine by means of alternate alkaline and acid hydrolysis of thiocolchicoside tetraacetate*

2 g. of thiocolchicoside tetraacetate are saponified by means 35 cc. of ethanol and 6 cc. of N sodium hydroxide solution for about 24 hours at room temperature. The reaction mixture is then acidified by means of 2 N hydrochloric acid and is heated under reflux for 36 hours. Subsequent treatment is effected in the same manner as set forth in Example 25. The yield of N-desacetyl desmethyl thiocolchicine is 75%.

*Example 29.—Production of N-desacetyl desmethyl thiocolchicine starting from thiocolchicoside*

2 g. of thiocolchicoside are hydrolyzed by means of hydrochloric acid during 40 hours under the conditions set forth in Example 26. The hydrochloric acid solution, after extraction with chloroform, yields 79% of N-desacetyl desmethyl thiocolchicine which is identical with the compound obtained according to Example 25.

*Example 30.—N-desacetyl-N-methyl thiocolchicine (Formula I, $R=CH_3$; $R_1=-CH_3$; $R_2=-CH_3$) starting from N-desacetyl thiocolchicine*

Into a sealable tube there are introduced 3.2 g. of N-desacetyl thiocolchicine and 1 g. of benzaldehyde. A reaction occurs immediately between the amino group of N-desacetyl thiocolchicine and benzaldehyde, thus giving the corresponding Schiff base, which is amorphous. The reaction product is triturated with ether and the solvent is then driven off. Then 1.6 g. of methyl iodide are introduced. The tube is sealed and heated at 100° C. for 5 hours.

After cooling, the reaction product is taken up in 100 cc. of methanol, 100 cc. of N sodium hydroxide solution are added, and the mixture is heated at 50° C. for five minutes and extracted with chloroform. The chloroform extract is dried over sodium sulfate and the solvent is distilled off. The residue obtained thereby is crude N-desacetyl-N-methyl-thiocolchicine, which is present in the form of a microcrystalline, yellow powder, melting at about 170° C. Said compound can be purified by chromatography over alumina so as to yield the pure product of the melting point 222° C., identical to that described in Example 40.

It is understood that methylation can also be effected with other methylation reagents, for instance, with methyl bromide or dimethyl sulfate. Finally, it is possible to produce the same compound by reacting methyl mercaptan with N-desacetyl-N-methyl colchicine.

*Example 31.—N-desacetyl-N-formyl thiocolchicine (Formula I, $R=-CH_3$; $R_1=-CHO$; $R_2=-CH_3$) starting from N-desacetyl thiocolchicine*

15 cc. of pure formic acid and 6 cc. of acetic acid anhydride are mixed at 0° C. The resulting mixture is allowed to stand for two hours at room temperature and is slowly run into a solution of 2 g. of N-desacetyl thiocolchicine in 20 cc. of pyridine, cooled to −10° C. After standing for two hours at room temperature, the mixture is diluted with 20 cc. of water, acidified to a pH-value of 2 by means of 0.2 N hydrochloric acid and extracted with chloroform. The chloroform extract is washed with water, then with sodium carbonate, and again with water, dried over magnesium sulfate, and evaporated to dryness. The residue obtained in this way is dissolved in 40 cc. of ethyl acetate from which solution it crystallizes. In this way 1.7 g. (80%) of N-desacetyl-N-formyl thiocolchicine are obtained, having a melting point of 259° C., $[\alpha]_D^{20} = -275°$, (0.5% concentration in chloroform). The product is recrystallized, for analysis purposes, from 180 parts by volume of ethyl acetate which is then concentrated to 100 parts by volume, followed by recrystallization from 20 parts by volume of methanol, and finally from 100 parts by volume of ether.

ANALYSIS

Found: C% 62.9, H% 6.0, N% 3.2, S% 8.0, O% 19.9. $C_{21}H_{23}I_5NS$ (401.46) requires C% 62.8, H% 5.8, N% 3.5, S% 8.0, O% 19.9.

The N-desacetyl-N-formyl thiocolchicine has never before been described; it is insoluble in water and ether, and is soluble in methanol, benzene, chloroform, and sparingly soluble in ethyl acetate.

*Example 32.—N-desacetyl-N-formyl desmethyl thiocolchicine (Formula I, R=H; $R_1$=—CHO; $R_2$=—$CH_3$) starting from N-desacetyl desmethyl thiocolchicine*

6 cc. of pur formic acid and 2.4 cc of acetic acid anhydride are mixed with each other at a temperature of 0° C. and the resulting mixture is allowed to stand for two hours at room temperature. This mixture is slowly added to a solution of 400 mg. of N-desacetyl desmethyl thiocolchicine in 8 cc. of pyridine cooled to —10° C. After standing for two hours at room temperature, the reaction mixture is diluted with water, acidified with 2 N hydrochloric acid until a pH value of 2 is obtained, and extracted with chloroform. The chloroform extracts are washed with water and then with N sodium hydroxide solution. Thereby the phenolic hydroxyl group is set free, and the resulting sodium salt passes into the aqueous phase. This aqueous phase is again acidified, as indicated above, and extracted with chloroform. The chloroform extracts are washed with water, dried with magnesium sulfate, and evaporated to dryness. The residue is taken up in 4 cc. of ethyl acetate from which it crystallizes. In this way there are obtained 370 mg. (83%) of N-desacetyl-N-formyl desmethyl thiocolchicine, having a melting point of 284–287° C., $[\alpha]_D^{20}$=—268° (0.5% concentration in chloroform).

The product is recrystallized for analysis purposes from a mixture of methanol and ether (1:4).

ANALYSIS

Found: C% 62.3, H% 5.7, N% 3.3, S% 8.4, O% 20.5. $C_{20}H_{21}O_5NS$ (387.44) requires C% 62.0, H% 5.5, N% 3.6, S% 8.3, O% 20.6.

The N-desacetyl-N-formyl desmethyl thiocolchicine has not been described heretofore; it is soluble in dilute alkalies and methanol, sparingly soluble in chloroform, and insoluble in water and ether.

*Example 33.—N-desacetyl-N-benzoyl thiocolchicine (Formula I, R=—$CH_3$; $R_1$=—$COC_6H_5$; $R_2$=—$CH_3$) starting from N-desacetyl thiocolchicine*

600 mg. of N-desacetyl thiocolchicine are dissolved in 6 cc. of pyridine, the solution is cooled to 0° C. and 3 cc. of benzoyl chloride are added. The resulting mixture is allowed to stand for two hours at room temperature, is diluted with water, extracted with chloroform, and the chloroform extracts are washed first with 2 N hydrochloric acid, then with water, thereafter with sodium bicarbonate, and again with water, and are dried over magnesium sulfate. The dried extract is evaporated to dryness. The resulting residue is taken up in 25 cc. of ethyl acetate from which it crystallizes. In this way 610 mg. (80%) of N-desacetyl-N-benzoyl thiocolchicine, having a melting point of 283–285° C., $[\alpha]_D^{20}$=—86° (0.5% concentration in chloroform) are obtained.

The product is recrystallized for purposes of analysis from an aqueous solution of dimethyl formamide.

ANALYSIS

Found: C% 67.7, H% 5.7, N% 2.7, S% 6.8. $C_{27}H_{27}O_5NS$ (477.56) requires C% 67.9, H% 5.7, N% 2.9, S% 6.7.

The N-desacetyl-N-benzoyl thiocolchicine has not been described heretofore; it is soluble in chloroform and dimethyl formamide, is sparingly soluble in ethyl acetate and is insoluble in water and ether.

*Example 34.—N-desacetyl-N.O-dibenzoyl desmethyl thiocolchicine (Formula I, R=—$COC_6H_5$; $R_1$=—$COC_6H_5$; $R_2$=—$CH_3$) starting from N-desacetyl desmethyl thiocolchicine*

800 mg. of N-desacetyl desmethyl thiocolchicine are dissolved in 24 cc. of pyridine, the resulting solution is cooled to 0° C., and 8 cc. of benzoyl chloride are added thereto. After allowing the mixture to stand for two hours at room temperature, 100 cc. of water are added, the mixture is extracted with chloroform, and the chloroform extracts are washed first with 2 N hydrochloric acid, then with water, thereafter with N sodium hydroxide solution, again with water, and are finally dried over magnesium sulfate. The dried extract is evaporated to dryness. The residue is taken up in 20 cc. of ether, to which 100 cc. of petroleum ether are added. In this way, 900 mg. (72%) of N-desacetyl-N.O-dibenzoyl desmethyl thiocolchicine in crystalline form, having a melting point of 264–266° C., $[\alpha]_D^{20}$=—114° (0.5% concentration in chloroform) are obtained. For analysis purposes, the product is recrystallized from an aqueous solution of dimethyl formamide.

ANALYSIS

Found: C% 70.0, H% 5.2, N% 2.6, S% 5.8, O% 17.4. $C_{33}H_{29}O_6NS$ (567.63) requires C% 69.8, H% 5.2, N% 2.5, S% 5.7, O% 16.9.

The N-desacetyl-N.O-dibenzoyl desmethyl thiocolchicine has not yet been described; it is insoluble in water and ether, sparingly soluble in acetone, and soluble in chloroform and dimethyl formamide.

*Example 35.—N-desacetyl-N-benzoyl desmethyl thiocolchicine (Formula I, R=H; $R_1$=$COC_6H_5$; $R_2$=—$CH_3$) starting from N-desacetyl-N.O-dibenzoyldesmethyl thiocolchicine.*

500 mg. of N-desacetyl-N.O-dibenzoyl desmethyl thiocolchicine, obtained according to Example 34, are dissolved in 15 cc. of ethanol, and 4 cc. of N sodium hydroxide solution are added. The resulting mixture is allowed to stand for two hours at room temperature, 50 cc. of water are added, and the mixture is extracted twice with chloroform. The aqueous solution is acidified with 2 N hydrochloric acid to a pH-value of 2, extracted with chloroform, the chloroform extracts are washed with water until the last traces of acid have disappeared, dried over magnesium sulfate, and evaporated to dryness. The residue is taken up in 5 cc. of ethyl acteate from which it crystallizes. In this way, 200 mg. of N-desacetyl-N-benzoyl desmethyl thiocolchicine, having a melting point of 252–254° C., $[\alpha]_D^{20}$=—38° (0.5% concentration in chloroform) are obtained.

The product is recrystallized for analysis purposes from acetone.

ANALYSIS

Found: C% 67.2, H% 5.6, N% 2.8, S% 7.0, O% 17.7. $C_{26}H_{25}O_5NS$ (463.53) requires C% 67.4, H% 5.4, N% 3.0, S% 6.9, O% 17.3.

The N-desacetyl-N-benzoyl desmethyl thiocolchicine has not previously been described; it is soluble in acetone and chloroform, but is insoluble in water and ether.

*Example 36.—N-desacetyl-N-carbethoxy thiocolchicine (Formula I, R=—$CH_3$; $R_1$=$CO_2C_2H_5$; $R_2$=—$CH_3$) starting from N-desacetyl thiocolchicine*

1 g. of N-desacetyl thiocolchicine is dissolved in 10 cc. of chloroform, the resulting solution is cooled to 0° C., and 5 cc. of ethyl chloroformate, and thereafter 10 cc. of triethylamine, are added. The mixture is heated under reflux during a period of one hour and is then allowed to stand for twelve hours at room temperature. The reaction mixture is then evaporated to dryness and triturated with 50 cc. of water, filtered with suction, the residue is washed with water, dried, and recrystallized from ether. 870 mg. (73%) of N-desacetyl-N-carbethoxy thiocolchicine, having a melting point of 195° C. and $$[\alpha]_D^{20} = -240°$$

(0.5% concentration in chloroform), are obtained.

ANALYSIS

Found: C% 61.9, H% 6.2, N% 2.9, S% 6.9. $C_{23}H_{27}O_6NS$ (445.52) requires C% 62.0, H% 6.1, N% 3.14, S% 7.19.

The N-desacetyl-N-carbethoxy thiocolchicine has not been described previously; it is soluble in ether, acetone, benzene and chloroform, but insoluble in water.

*Example 37.—Conversion of N-desacetyl desmethyl thiocolchicine into desmethyl thiocolchicine*

425 mg. of N-desacetyl desmethyl thiocolchicine are dissolved in a mixture of 20 cc. of pyridine and 20 cc. of acetic acid anhydride. After standing at room temperature, dilution with water, and extraction with chloroform, the chloroform extract is washed, dried, and distilled to dryness. The resulting residue is then treated with 1.2 cc. of N sodium hydroxide solution and 7 cc. of ethanol. After dilution with water, carbon dioxide is bubbled through the solution in order to convert the excess of sodium hydroxide into sodium bicarbonate. The resulting solution is extracted with chloroform and the extract is evaporated to dryness. The residue is taken up in as little hot dimethyl formamide as possible and ethyl acetate is added thereto. In this way there are obtained 250 mg. of desmethyl thiocolchicine, having a melting point of 308° C. and $[\alpha]_D^{20} = -249°$ (0.5% concentration in chloroform), which is identical to the compound used in Example 25 as starting material.

*Example 38.—Production of N-desacetyl ethyl thiocolchiceine (Formula I, R=—CH₃; R₁=H; R₂=—C₂H₅)*

700 mg. of ethyl thiocolchiceine, obtained in accordance with any one of Examples 15 to 21, are dissolved in 10 cc. of methanol, and 10 cc. of 2 N hydrochloric acid are added thereto. This mixture is heated under reflux for sixteen hours, is then allowed to cool, and is poured into water. The resulting aqueous solution is washed with chloroform, made alkaline with sodium hydroxide, and extracted with chloroform. The extract is washed, dried, and evaporated to dryness. The resulting residue is crystallized from a mixture of ethyl acetate and ether (2:3), and yields 520 mg. (83%) of N-desacetyl ethyl thiocolchiceine which, after recrystallization, melts at 163° C., $[\alpha]_D^{20} = -219°$ (0.5% concentration in chloroform). This compound, which has never been described before, is present in the form of yellow crystals, which are insoluble in water, ether, and petroleum ether, and are soluble in aqueous acids, chloroform, dimethyl formamide, acetone, and in 9 parts by volume of hot alcohol.

ANALYSIS

Found: C% 65.3, H% 6.5, O% 16.5, N% 3.4, S% 8.2. $C_{21}H_{25}O_4NS$ (387.48) requires C% 65.1, H% 6.5, O% 16.5, N% 3.6, S% 8.3.

*Example 39.—Production of N-desacetyl ethyl thiocolchiceine (Formula I, R=CH₃; R₁=H; R₂=C₂H₅)*

700 mg. of ethyl thiocolchiceine are dissolved in 10 cc. of methanol, and 10 cc. of 2 N hydrobromic acid are added thereto. The resulting mixture is heated under reflux for sixteen hours and is then worked up as set forth in Example 38. In this way N-desacetyl ethyl thiocolchiceine, having a melting point of 163° C., $[\alpha]_D^{20} = -219°$ (0.5% concentration in chloroform), is obtained with a crude yield of 60%. This compound is identical with the one described in the preceding example.

*Example 40.—Production of N-desacetyl-N-methyl thiocolchicine (Formula I, R=—CH₃; R₁=—CH₃; R₂=—CH₃)*

1.5 g. of colchicum substance F or demecolcine (isolated from meadow saffron according to the procedure disclosed by F. Santavy, Pharm. Acta Helv., 1950, vol. 25, page 248), having a melting point of 183° C. (on the Maquenne bloc), $[\alpha]_D^{20} = -127°$ (1% concentration in chloroform), are dissolved in 7.5 cc. of methanol. 7.5 cc. of water and 1.5 g. of sodium mercaptide in the crystalline form are added thereto, and the resulting clear solution is allowed to stand for twenty four hours at 20° C. Abundant crystallization occurs. After filtering with suction, washing with water, and drying, the resulting product weighs 1.25 g. corresponding to a yield of 80%; melting point 215° C.

By recrystallization from a mixture of methanol and water (1:1) or acetone and water, the melting point of the thiodemecolcine in the pure state reaches 222° C. (on the Maquenne bloc). $[\alpha]_D = -164°$ (0.5% concentration in chloroform). The compound is present in the form of irregular, yellow prisms, which are readily soluble in dilute aqueous hydrochloric acid, chloroform and dimethyl formamide. The substance is soluble in ethanol and methanol, is sparingly soluble in ethyl acetate, and is insoluble in water, ether, and petroleum ether.

ANALYSIS

Found: C% 65.3, H% 6.7, N% 3.4, S% 8.0. $C_{21}H_{25}O_4NS$ (387.48) requires C% 65.1, H% 6.5, N% 3.6, S% 8.3.

*Example 41.—Production of N-desacetyl-N-methyl thiocolchicine (Formula I, R=—CH₃; R₁=—CH₃; R₂=—CH₃)*

1.5 g. of naturally occurring colchicum substance F are dissolved in 7.5 cc. of water and 8 cc. of an aqueous solution containing 1.2 g. of potassium hydroxide and 1.1 g. of methyl mercaptan, which solution was previously prepared at 0° C., are added thereto. After allowing the mixture to stand for twenty four hours at 20° C., it is diluted with water, extracted with chloroform, and washed with water. After drying the solution and evaporating the solvent in a vacuum, the residue weighing 1.5 g. is present in the form of an amorphous powder having a melting point of approximately 170° C., which, after taking up in methanol and dilution with water (1:1), gives, on seeding with a sample produced according to Example 40, N-desacetyl-N-methyl thiocolchicine or thiodemecolcine, having a melting point of 222° C., with a yield of 50%. The compound is identical in every respect with the one obtained in the preceding example.

In place of methyl and ethyl mercaptan used in the preceding examples, there can be employed equimolecular amounts thereof primary and secondary alkyl mercaptans such as n-propyl mercaptan, isopropyl mercaptan, n-butyl mercaptan, isobutyl mercaptan, amyl mercaptan, mercapto propanol, mercapto butanol. The reaction of these mercaptans with colchiceine and isocolchiceine compounds is otherwise carried out in the same manner as described in said preceding examples.

In place of the acetate of colchiceine as used in Example 5 and the acetate of desmethyl colchiceine as used in Examples 6 and 8 there can be used equimolecular amounts thereof of an acylated colchiceine and desmethyl colchiceine compound corresponding to the above given Formula I but having another acyl group than the acetyl group, such as the propionates, the butyrates, the benzoates, the carbomethoxy, the carbethoxy derivatives of colchiceine and desmethyl colchiceine compounds while otherwise the procedure is the same as set forth in said examples.

In place of formic acid as used in Examples 31 and 32, of benzoyl chloride as used in Examples 33 and 34, or of chloro formic acid ethyl ester as used in Example 36, there can be employed equimolecular amounts thereof of other acylating agents such as propionic acid, propionyl chloride, butyroyl chloride, toluic acid chloride, chloro formic acid methyl ester, and others. Otherwise, the procedure during such acylation is the same as set forth in said examples.

The new thio-derivatives of colchiceine compounds according to the present invention are used, for instance, in agriculture in the form of their solutions in suitable solvents or in mixture with solid carrier materials. Concentrations between 0.02% and 0.2% have proved to be of great value in the treatment of seeds to produce polyploidism.

Said new thio-derivatives of colchiceine compounds according to the present invention as they are disclosed herein, are also of therapeutic use in human as well as in veterinary medicine. In human medicine they are topically applied, for instance, in the treatment of inflammatory or allergic diseases of the skn such as pruritus and erythematous-edematous conditions, and are also useful for modifying of the karyokinesis of the bone marrow and for the treatment of other mitotic disorders. In veterinary medicine the new compounds have proved of value in the topical treatment of inflammatory diseases of the skin, such as dog's eczema and for advantageously modifying the chromosomes in breeding animals resulting in increased vitality and acceleration of cross-breeding. It may be mentioned that ordinarily colchiceine compounds can be reacted with alkyl mercaptans in the presence of acid catalysts as well as with an alkali metal salt of said alkyl mercaptan while isocolchiceine compounds always require the presence of an acid catalyst and do not react satisfactorily with the alkali metal salt of said alkyl mercaptans.

The term "acyl" as used hereinbefore and in the claims annexed hereto indicates not only the acyl radicals derived, for instance, from lower aliphatic acids and phenyl monocarboxylic acids, but also carbalkoxy radicals derived from carbonic acid.

Of course, many other changes and variations in the starting materials, the reaction components, the reaction conditions, temperature, and duration, the mode of working up the reaction products and of isolating and purifying the same may be made by those skilled in the art in accordance with the principles set forth herein and in the claims annexed hereto.

We claim:

1. As a new compound, a thiocolchiceine compound of the formula

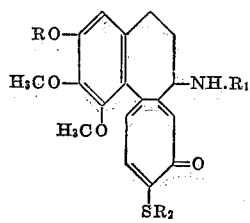

wherein R is a member selected from the group consisting of hydrogen, the methyl radical, the benzoyl radical, the glucosyl radical, and the tetraacetyl glucosyl radical, $R_1$ is a member selected from the group consisting of hydrogen, the methyl radical, the lower alkanoyl, the benzoyl, and the carbethoxy radical, and $R_2$ is a member selected from the group consisting of a lower alkyl radical and a hydroxyl (lower) alkyl radical.

2. 2-Hydroxy ethyl thiocolchiceine of the formula

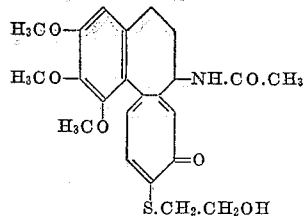

3. Thiocolchicoside of the formula

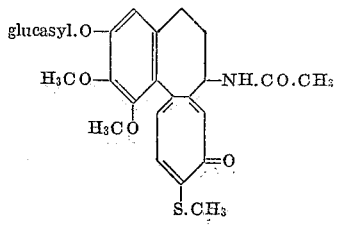

4. N-desacetyl thiocolchicine of the formula

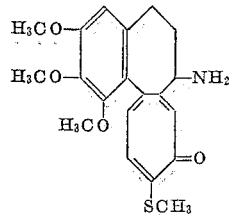

5. N-desacetyl desmethyl thiocolchicine of the formula

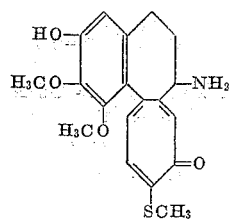

6. N-desacetyl-N-formyl thiocolchicine of the formula

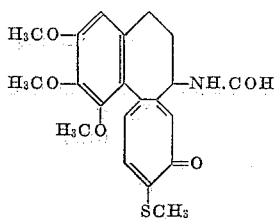

7. A process according to claim 10, wherein the reaction with the lower alkyl mercaptan is carried out at a temperature between about 10° C. and about 50° C.

8. A process according to claim 7, wherein the reaction with the lower alkyl mercaptan is carried out in the presence of an acid catalyst.

9. A process according to claim 7, wherein the reaction of a colchiceine derivate with the lower alkyl mercaptan is carried out with an alkali metal salt of the alkyl mercaptan.

10. In a process of producing a thiocolchiceine compound of the formula

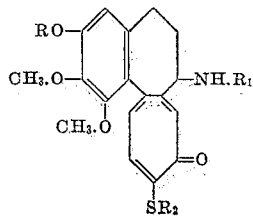

wherein:

R is a member selected from the group consisting of hydrogen, the methyl radical, the benzoyl group, the glucosyl group, and the tetraacetyl glucosyl group, $R_1$ is a member selected from the group consisting of hydrogen, the methyl radical, a lower alkanoyl group, the benzoyl group, and the carbethoxy group, and $R_2$ is a member selected from the group consisting of a lower alkyl radical and a hydroxy (lower) alkyl radical, the steps comprising heating in a sealed tube an excess of a lower alkyl mercaptan with a compound selected from the group consisting of a colchiceine compound of the formula

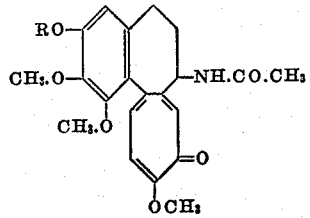

and an isocolchiceine compound of the formula

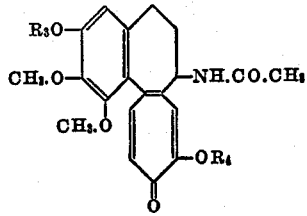

in which formulas:

R represents the same member as indicated above, $R_3$ is a member selected from the group consisting of hydrogen, the methyl radical, the benzoyl group, the glucosyl group, and the tetraacetyl glycosyl group, and $R_4$ is a member selected from the group consisting of hydrogen, the methyl radical, a lower alkanoyl group, the benzoyl group, and the carbethoxy group, until formation of the thiocolchiceine compound of the above given formula is completed, and isolating the reaction product from the reaction mixture.

References Cited in the file of this patent

Santavy et al.: "Helv. Chim. Acta," vol. 33, 1950, pages 1611, 1614 to 1627.

Goldberg et al.: "Cancer," vol. 3 (1950), pages 124 to 129.

Lettre "Angewandte Chemie," vol. 63 (1951), pages 422 to 424.